(12) United States Patent
Lopatecki et al.

(10) Patent No.: US 11,315,043 B1
(45) Date of Patent: Apr. 26, 2022

(54) SYSTEMS AND METHODS FOR OPTIMIZING A MACHINE LEARNING MODEL

(71) Applicant: ARIZE AI, INC., Mill Valley, CA (US)

(72) Inventors: Jason Lopatecki, Mill Valley, CA (US); Aparna Dhinakaran, Dublin, CA (US)

(73) Assignee: ARIZE AI, INC., Mill Valley, CA (US)

( * ) Notice: Subject to any disclaimer, the term of this patent is extended or adjusted under 35 U.S.C. 154(b) by 0 days.

(21) Appl. No.: 17/212,202

(22) Filed: Mar. 25, 2021

(51) Int. Cl.
*G06K 9/62* (2006.01)
*G06N 20/00* (2019.01)

(52) U.S. Cl.
CPC .............. *G06N 20/00* (2019.01); *G06K 9/623* (2013.01); *G06K 9/6231* (2013.01)

(58) Field of Classification Search
CPC ....... G06N 20/00; G06K 9/623; G06K 9/6231
See application file for complete search history.

(56) References Cited

U.S. PATENT DOCUMENTS

| | | | | |
|---|---|---|---|---|
| 2019/0306011 A1* | 10/2019 | Fenoglio | .............. | G06N 3/0427 |
| 2021/0074425 A1* | 3/2021 | Carter | .................... | G16H 50/20 |
| 2021/0220670 A1* | 7/2021 | Li | .............................. | G06T 7/11 |

\* cited by examiner

*Primary Examiner* — David F Dunphy
(74) *Attorney, Agent, or Firm* — DLA Piper LLP (US)

(57) ABSTRACT

A system for optimizing a machine learning model. The machine learning model generates predictions based on at least one input feature vector, each input feature vector having one or more vector values; and an optimization module with a processor and an associated memory, the optimization module being configured to: create at least one slice of the predictions based on at least one vector value, determine at least one optimization metric of the slice that is based on at least a total number of predictions for the vector value, and optimize the machine learning model based on the optimization metric.

18 Claims, 14 Drawing Sheets

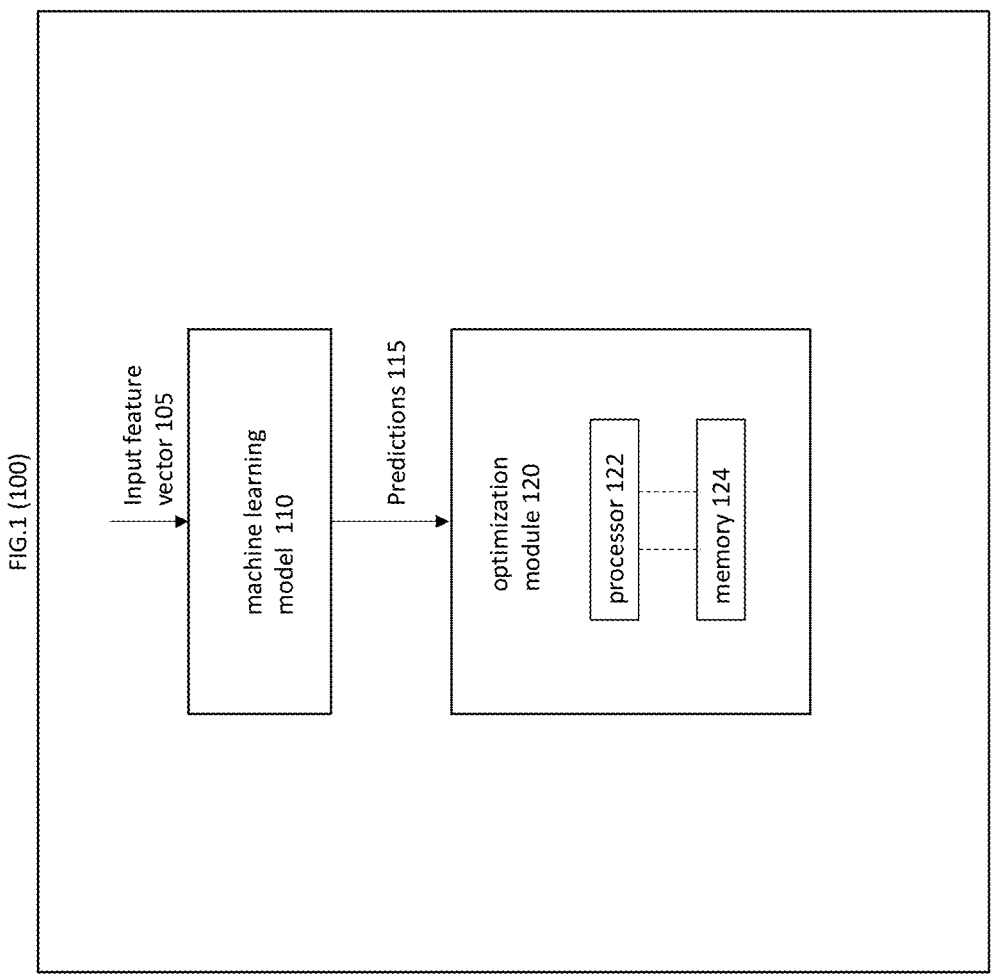

FIG.2 (200)

| | | | | |
|---|---|---|---|---|
| REGION | CA | CA | DE | CA |
| CHG AMOUNT | 34,000 | 100 | 4,000 | 27,000 |
| LAST CHG AMOUNT | 100 | 100 | 4,000 | 4,000 |
| MERCHANT TYPE | PAWN | GAS | GAS | PAWN |
| Inputs Features | Prediction 1 | Prediction 2 | Prediction 3 | Prediction 4 |

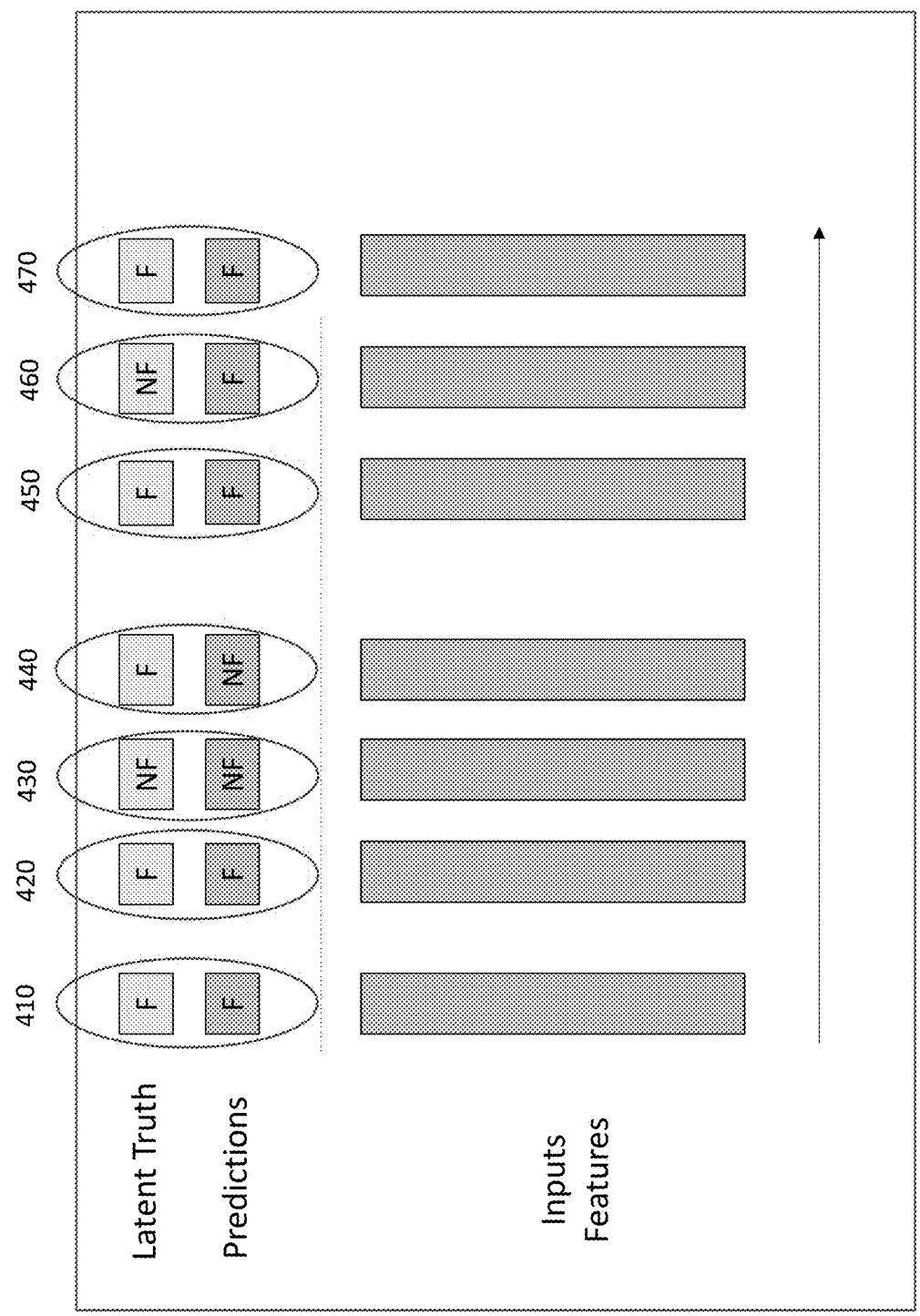
FIG. 4 (400)

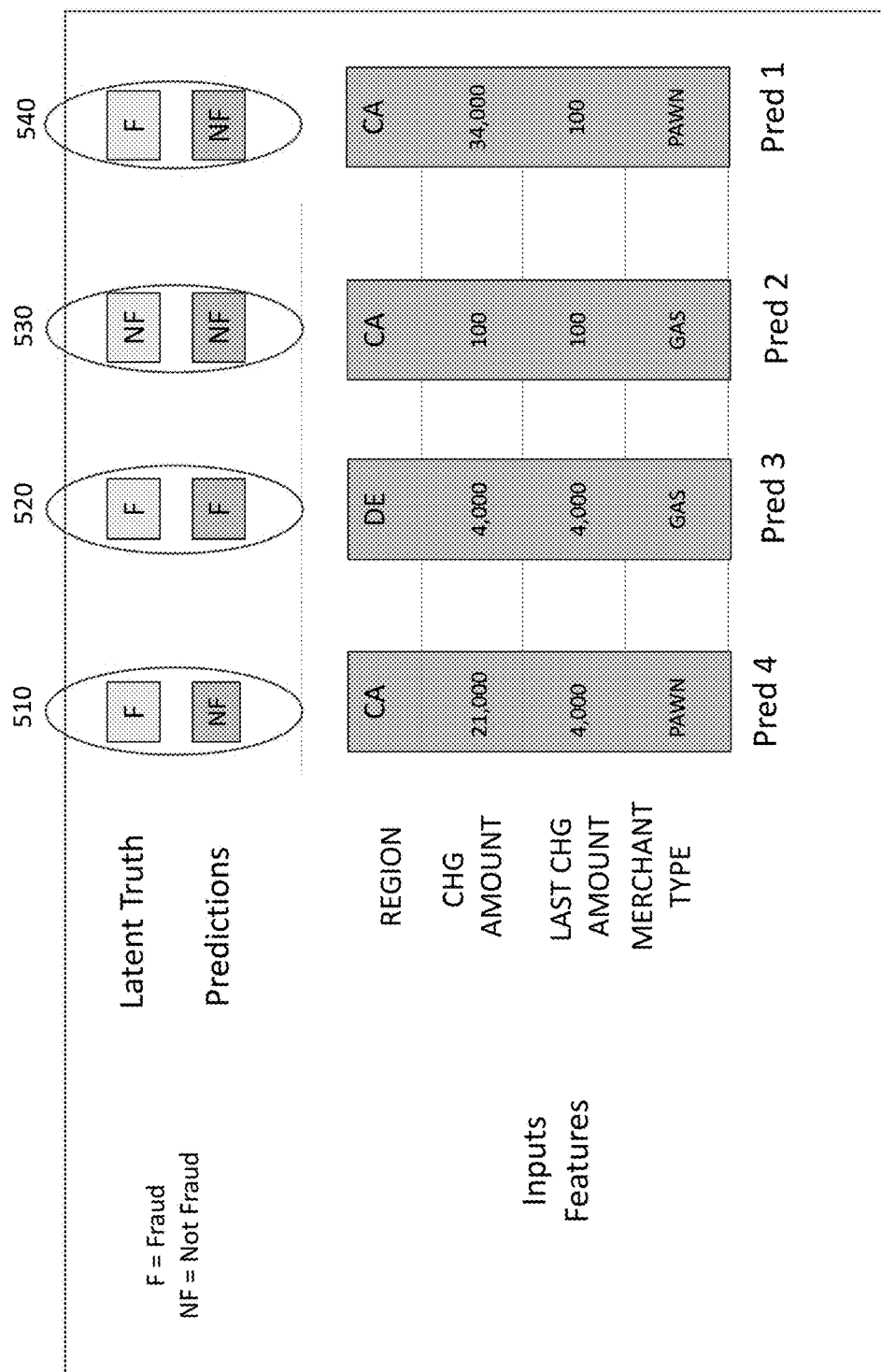
FIG. 5 (500)

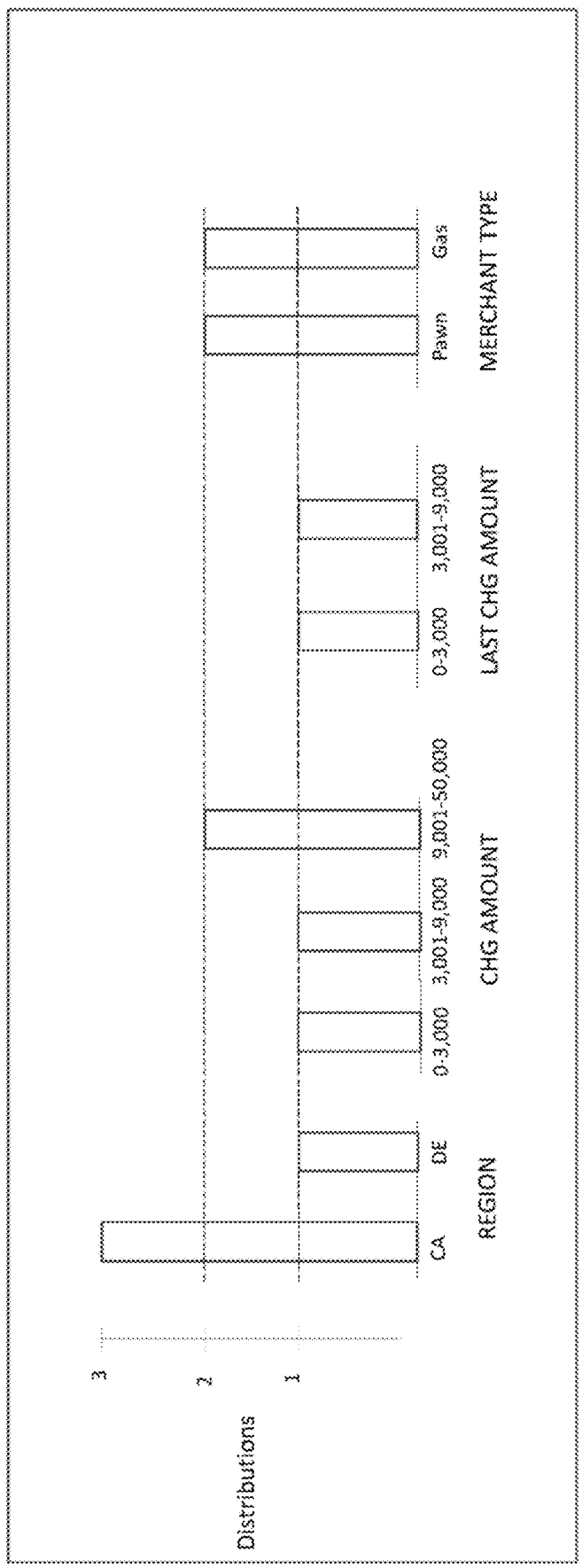

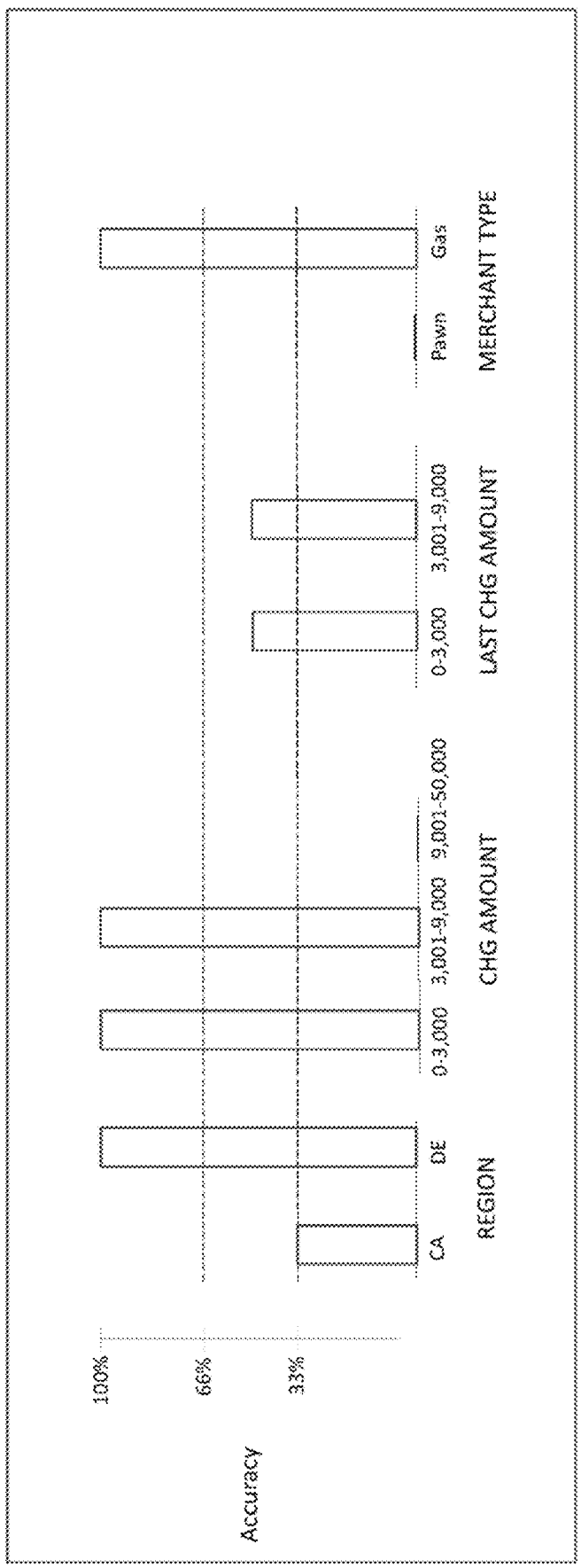

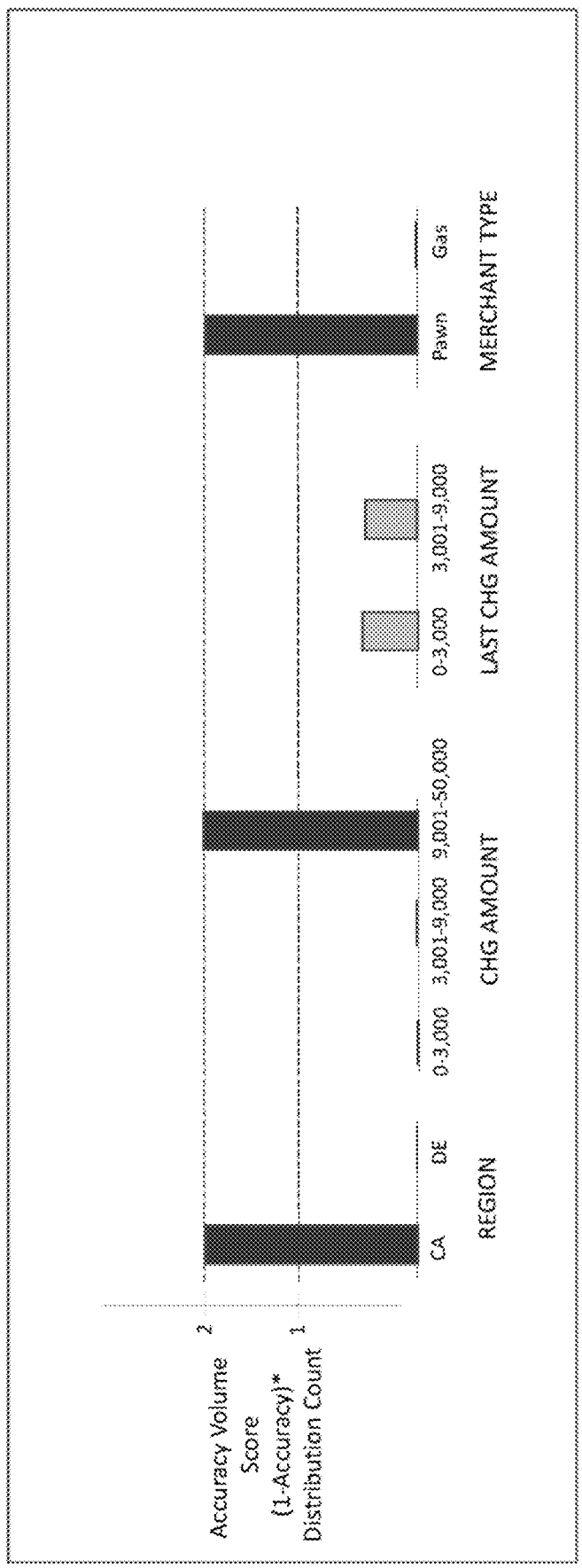
FIG.6C (630)

FIG.10 (1000)

SYSTEMS AND METHODS FOR OPTIMIZING A MACHINE LEARNING MODEL

FIELD

The present disclosure relates to systems and methods for optimizing a machine learning model.

BACKGROUND

Machine learning models can take inputs and make predictions or decisions based on the inputs. This involves computers learning from provided data so that they can carry out certain tasks. Many known techniques can be used to develop training data and build a machine learning model based on the training data. After a model is built, it can be fine-tuned or optimized to improve its performance.

Known techniques to optimize a machine learning model utilize an overall aggregate performance and/or average performance metrics. With such techniques, however, it is difficult to identify issues (e.g. wrong predictions) that are mainly responsible for affecting the model's overall performance. There is a desire and need to overcome these challenges.

SUMMARY

The present disclosure provides systems and methods to overcome the aforementioned challenges. The disclosed systems and methods use groups (facets or slices) of predictions to troubleshoot issues disregarded by known model optimization approaches that are global in nature.

In an example embodiment, a system for optimizing a machine learning model is disclosed. The system can include a machine learning model that generates predictions based on at least one input feature vector, each input feature vector having one or more vector values. The system can include an optimization module with a processor and an associated memory. The optimization module can be configured to create at least one slice of the predictions based on at least one vector value, determine at least one optimization metric of the slice that is based on at least a total number of predictions for the vector value, and optimize the machine learning model based on the optimization metric.

In various example embodiments, the optimization metric may include accuracy that is determined based on a ratio of the sum of a number of true positives (TPs) and true negatives (TNs) and a sum of a number of TPs, false positives (FPs), TNs and false negatives (FNs). The optimization metric may further include an accuracy volume score (AVS) that is determined based on multiplying a complement of the accuracy with a distribution count of the slice.

In various example embodiments, the optimization metric may include precision that is determined based on a ratio of a number of TPs and a sum of a number of TPs and FPs. The optimization metric may further include a precision volume score (PVS) that is determined based on multiplying a complement of the precision with a distribution count of the slice.

In various example embodiments, the optimization metric may include recall that is determined based on a ratio of a number of TPs and a sum of a number of TPs and FNs, and F1 that is determined based on a ratio of a multiplication of recall and precision and a sum of recall and precision. The optimization metric may include a F1 volume score (F1VS) that is determined based on multiplying a complement of the F1 with a distribution count of the slice.

In various example embodiments, the optimization metric may include recall that is determined based on a ratio of a number of TPs and a sum of a number of TPs and FNs. The optimization metric may further include a recall volume score (RVS) that is determined based on multiplying a complement of the recall with a distribution count of the slice.

In various example embodiments, the at least one slice may include a first slice and a second slice such that the first slice's optimization metric is higher than the second slice's optimization metric, and the optimization module can be configured to fix the first slice to optimize the machine learning model.

In various example embodiments, the at least one slice may include a first slice and a second slice such that the first slice's optimization metric is equal to the second slice's optimization metric, and the optimization module can be configured to fix both the first slice and the second slice to optimize the machine learning model.

In various example embodiments, the at least one slice includes multiple slices based on multiple vector values respectively, and the optimization module can be configured to sort the multiple slices based on their respective optimization metric.

In an example embodiment, a computer-implemented method for optimizing a machine learning model is disclosed. The method may include obtaining multiple predictions from a machine learning model, the predictions being based on at least one input feature vector, each input feature vector having one or more vector values; creating at least one slice of the predictions based on at least one vector value; determining at least one optimization metric of the slice that is based on at least a total number of predictions for the vector value; and optimizing the machine learning model based on the optimization metric.

BRIEF DESCRIPTION OF DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which:

FIG. 1 shows a system for optimizing a machine learning model according to an exemplary embodiment of the present disclosure;

FIG. 2 shows a diagram comparing predictions with latent truth data according to an exemplary embodiment of the present disclosure;

FIG. 4 shows a diagram with certain input feature vectors according to an exemplary embodiment of the present disclosure;

FIG. 5 shows a diagram comparing predictions with latent truth data according to an exemplary embodiment of the present disclosure;

FIGS. 6A-6C show histograms that visualize generation of an accuracy volume score according to an exemplary embodiment of the present disclosure;

DESCRIPTION

Figure 3A:
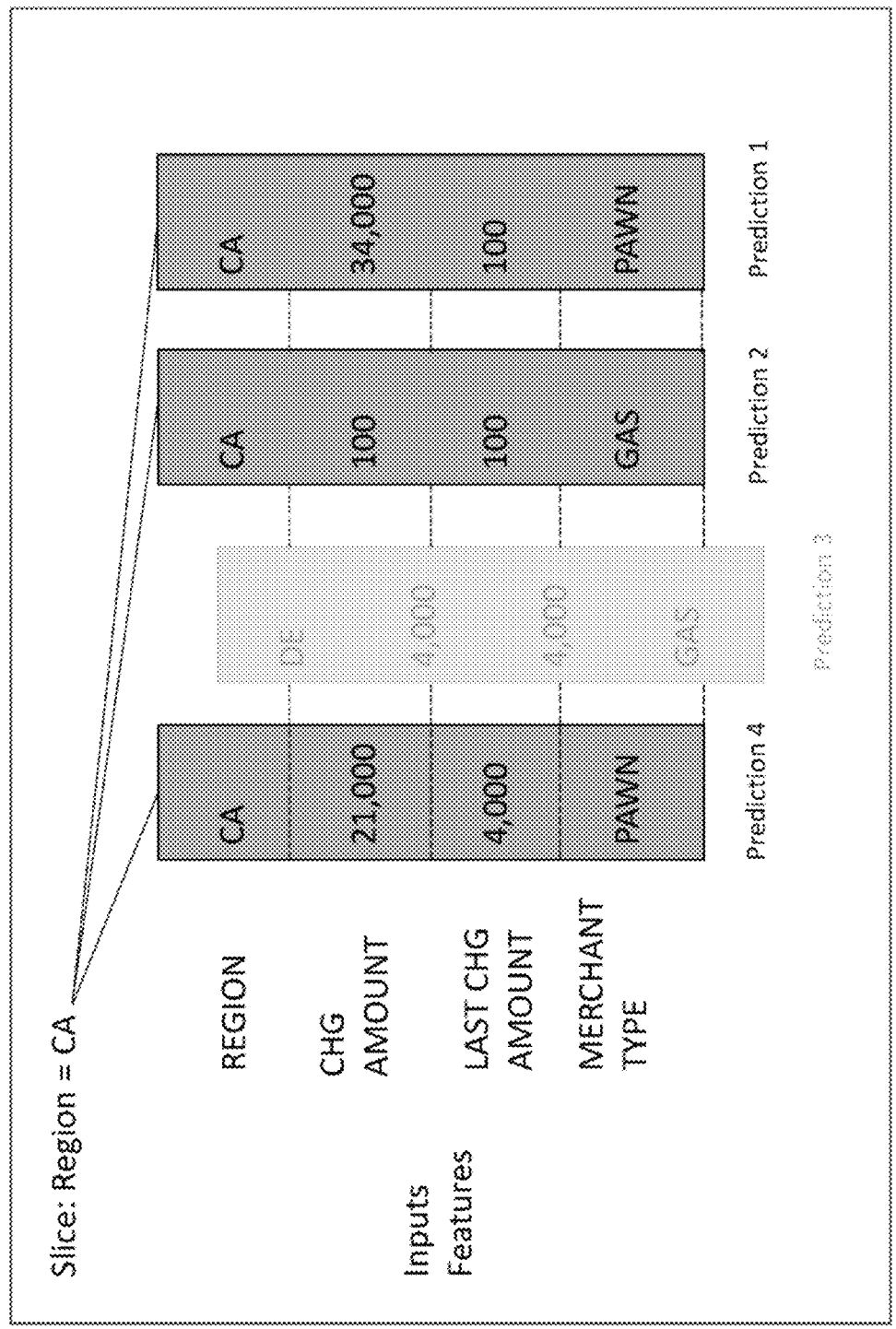
FIGS. 3A and 3B show diagrams of slices based on different vector values according to an exemplary embodiment of the present disclosure.

The disclosed techniques can be deployed to analyze a machine learning model where certain predictions or groups of predictions generated by the model have underperformed. The techniques described herein can identify and analyze such predictions to optimize the machine learning model.

FIG. 1 shows an example system 100 for optimizing a machine learning model. The system 100 may include a machine learning model 110 that can generate multiple predictions 115 based on at least one input feature vector 105. The input feature vector 105 can have one or more vector values. The machine learning model 110 can be trained using a training dataset and one or more algorithms.

Input feature vector 105, as used herein, can be an individual measurable property or characteristic of a phenomenon being observed. For example, FIG. 2 shows an example diagram 200 with example input feature vectors 105 shown as 'REGION', 'CHG AMOUNT', 'LAST CHG AMOUNT' and 'MERCHANT TYPE', each with multiple vector values. 'REGION' can have values of 'CA' and DE'. 'CHG AMOUNT' can have values of '21,000', '4,000', '100' and '34,000'. 'LAST CHG AMOUNT' can have values of '4,000', '4,000', '100' and '100'. 'MERCHANT TYPE' can have values of 'PAWN' and 'GAS'.

Diagram 200 further shows multiple predictions 115 (Predictions 1, 2, 3 and 4), such that each prediction can have values based on each input feature vector 105. For example, Prediction 1 has values 'CA', '34,000', '100' and 'PAWN'. Prediction 2 has values 'CA', '100', '100' and 'GAS'. Prediction 3 has values 'DE', '4,000', '4,000' and 'GAS'. Prediction 4 has values 'CA', '21,000', '4,000' and 'PAWN'.

The system 100 can include an optimization module 120 with a processor 122 (e.g., a central processing unit (CPU), a graphics processing unit (GPU), etc.) and an associated memory 124. The optimization module 120 can be configured to create at least one slice (i.e. grouping) of the predictions 115 based on at least one vector value 105.

In an example embodiment, user input (e.g. touchscreen, mouse-click, etc.) can be used to generate a slice by grouping the predictions 115 on a user interface. A machine learning algorithm can be applied to the multiple predictions 115 to create the at least one slice of the predictions. As such, unsupervised learning algorithms (e.g. k-means) that do not require pre-existing labels can be used. Alternately supervised learning algorithms can also be used.

Figure 3B:
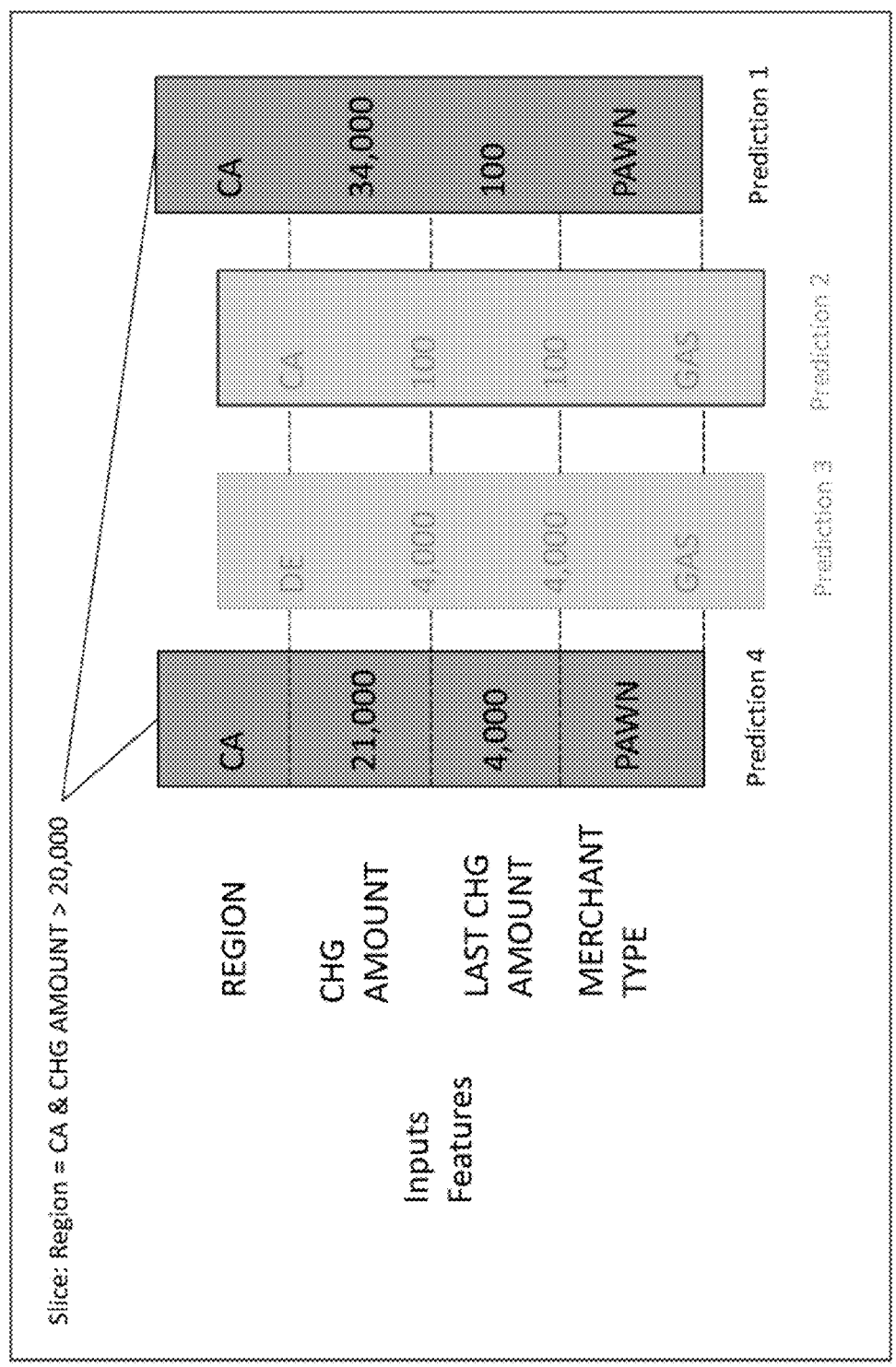

FIG. 3A shows an example slice based on REGION=CA created using any of the aforementioned techniques. Such a slice includes Predictions 4, 2 and 1. FIG. 3B shows another example slice based on REGION=CA and CHG AMOUNT>20,000 created using any of the aforementioned techniques. Such a slice includes Predictions 4 and 1.

The optimization module 120 can be configured to determine at least one optimization metric of the slice that is based on at least a number of total predictions for the vector value. The determination of various optimization metrics are described as follows.

FIG. 4 shows an example diagram 400 to visualize a generation of various optimization metrics. Diagram 400 shows seven predictions (each input feature corresponding to a slice of prediction) compared with the latent truth data (e.g. ground truth) to determine which of the multiple predictions are correct or incorrect. Of these, for 410, 420, 430, 450 and 470, the latent truth data matches the predictions. Therefore, the overall accuracy is (5/7)*100=71.42%.

If a prediction of a slice is true (also called not false (NF)) and a latent truth of the slice is also true, their comparison is considered a True Positive (TP). 430 is an example of a TP. If a prediction is true but a latent truth is false, their comparison is considered a False Positive (FP). 440 is an example of a FP. If the prediction is false and a latent truth is also false, their comparison is considered a True Negative (TN). 410, 420, 450 and 470 are examples of a TN. If the prediction is false but a latent truth is true, their comparison is considered a False Negative (FN). 460 is an example of a FN. Therefore, the number of TPs=1, the number of FPs=1, the number of TNs=4 and the number of FNs=1.

In an example embodiment, the optimization module 120 can be configured to determine an optimization metric called Accuracy, which can be a ratio of the sum of a number of TPs and TNs and sum of a number of TPs, FPs, TNs and FNs. That is, Accuracy=(TP+TN)/(TP+FP+TN+FN). In the example of diagram 400, Accuracy=(1+4)/(1+1+4+1)=5/7.

In an example embodiment, the optimization module 120 can be configured to determine an optimization metric called Precision, which can be a ratio of a number of TPs and a sum of a number of TPs and FPs. That is, Precision=TP/(TP+FP). In the example of diagram 400, Precision=(1)/(1+1)=½.

In an example embodiment, the optimization module 120 can be configured to determine an optimization metric called Recall, which can be a ratio of a number of TPs and a sum of a number of TPs and FNs. That is, Recall=TP/(TP+FN). In the example of diagram 400, Recall=(1)/(1+1)=½.

In an example embodiment, the optimization module 120 can be configured to determine an optimization metric called F1, which can be a ratio of a multiplication of Recall and Precision and a sum of Recall and Precision. That is, F1=Recall*Precision/(Recall+Precision). In the example of diagram 400, F1=(½*½)/(½+½)=¼.

FIG. 5 shows another example diagram 500 to visualize a generation of various optimization metrics. Diagram 500 illustrates four predictions compared with the latent truth data. Of these, for 520 and 530, the latent truth data matches the predictions. Therefore, the overall accuracy is (½)*100=50%.

Predictions 4, 2 and 1 form a slice of prediction with REGION as CA. Of these, Prediction 4 is a FP (prediction is true but latent truth is false), Prediction 2 is a TP (prediction and latent truth are both true), and Prediction 1 is a FP (prediction is true but latent truth is false). Therefore, for 'REGION=CA' slice of prediction, Accuracy=(TP+TN)/(TP+FP+TN+FN)=(1+0)/(1+2+0+0)=⅓. Prediction 3 forms a slice of prediction with REGION as DE. Prediction 3 is a TN (prediction and latent truth are both false. Therefore, for 'REGION=DE' slice of prediction, Accuracy=(TP+TN)/(TP+FP+TN+FN)=(0+1)/(0+0+1+0)=1.

While the previous example is directed at the Accuracy optimization metric, a person of ordinary skill in the art would appreciate that other features of the model can be analyzed. For example, optimization metrics such Precision, Recall, F1, False Positive Rate, False Negative Rate can be analyzed, as previously described. Similarly, other classification optimization metrics such as Sensitivity, Specificity can be analyzed. Regression optimization metrics such as root-mean-squared error (RMSE), mean-squared error (MSE), mean average error (MAE), mean average percentage error (MAPE), and % of predictions outside of % performance threshold can also be analyzed.

FIGS. 6A, 6B, 6C respectively show example histograms 610, 620 and 630 to visualize a generation of various optimization metrics in accordance with the disclosed principles. Histogram 610 shows a distribution count based on various input feature vectors values in diagram 500. The distribution count of a slice can be the number of predictions of that slice.

For example, the distribution count of slice 'REGION=CA' is 3. the distribution count of slice 'REGION=DE' is 1. The distribution count of slice 'CHG AMOUNT=0-3,000' is 1. The distribution count of slice 'CHG AMOUNT=3,001-9,000' is 1. The distribution count of slice 'CHG AMOUNT=9,001-50,000' is 2. The distribution count of slice 'LAST CHG AMOUNT=0-3,000' is 1. The distribution count of slice 'LAST CHG AMOUNT=3, 001-9,000' is 1. The distribution count of slice 'MERCHANT TYPE=PAWN' is 2. The distribution count of slice 'MERCHANT TYPE=GAS is 2.

Histogram 620 shows the Accuracy of the various prediction slices. The Accuracy of REGION=CA is 33% (or ⅓) and the accuracy of REGION=DE is 100% (or 1), as previously described. Similarly, calculating based on the previously described formula, Accuracy=(TP+TN)/(TP+FP+TN+FN), the Accuracy of CHG AMOUNT between 0-3,000 is 100% (or 1), CHG AMOUNT between 3,001-9,000 is 100% (or 1), and the Accuracy of CHG AMOUNT between 9,001-50,000 is 0. The Accuracy of LAST CHG AMOUNT between 0-3,000 is 50% (or ½) and the Accuracy of LAST CHG AMOUNT between 3,001-9,000 is also 50% (or ½). The Accuracy of MERCHANT TYPE=PAWN is 0 and the Accuracy of MERCHANT TYPE=GAS is 100% (or 1).

In an example embodiment, to link performance and volume of a slice into a single optimization metric, the performance by slice can be multiplied with the volume of the slice. Such a metric provides a fair comparison of slices irrespective of their size. This may allow for a creation of complex multidimensional slices and use the same metric for performance analysis.

By fixing/adjusting the slice with the highest score, the performance of machine learning model can improve the most. Because the volume is normalized as part of the score, comparison of small volume slices to large volume slices can be made. This allows a creation of complex multidimensional slices and use the same metric for performance analysis.

Histogram 630 shows an example of an optimization metric called Accuracy Volume Score (AVS) of the various slices in histograms 610 or 620. The optimization module 120 can be configured to generate AVS of the slice by multiplying a complement of the Accuracy with the distribution count. That is, AVS equals (1−Accuracy)*Distribution count.

For REGION=CA, AVS=(1−⅓)*3=2. For REGION=DE, AVS=(1−1)*1=0. For CHG AMOUNT=0-3,000, AVS=(1−1)*1=0. For CHG AMOUNT=3,001-9,000, AVS=(1−1)*1=0. For CHG AMOUNT=9,001-50,000, AVS=(1−0)*2=2. For LAST CHG AMOUNT=0-3,000, AVS=(1−½)*1=½. For LAST CHG AMOUNT=3,001-9,000, AVS=(1−½)*1=½. For MERCHANT TYPE=PAWN, AVS=(1−0)*2=2. For MERCHANT TYPE=GAS, AVS=(1−1)*2=0.

Figure 7:
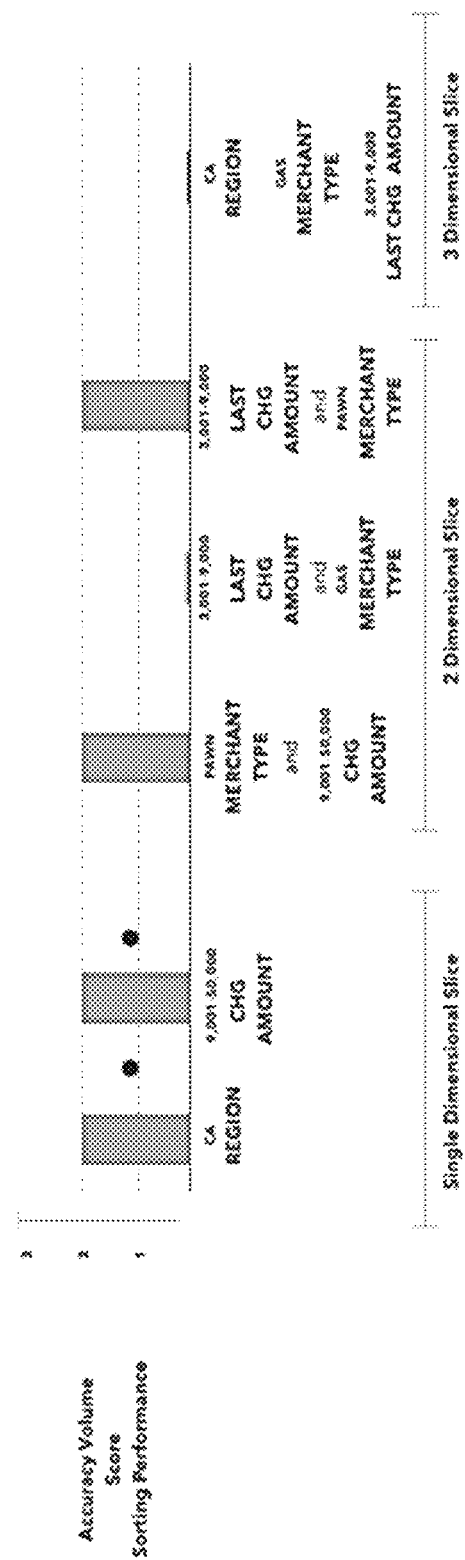
FIG. 7 shows a normalized Accuracy Volume Score (AVS) of slices of various dimensions according to exemplary embodiment of the present disclosure.

FIG. 7 shows sorted AVS of slices of various dimensions. The dimension of a slice depends on a number of input feature vectors used to create the slice. For example, if the slice is based on only one input feature vector, it is considered a single dimensional slice. Similarly, if the slice is based on two input feature vectors, it is considered a two-dimensional slice. Because the slices in FIG. 7 are normalized by volume, various dimensions can be properly compared. Similarly, other optimization metrics can also be used for comparison.

Figure 8:
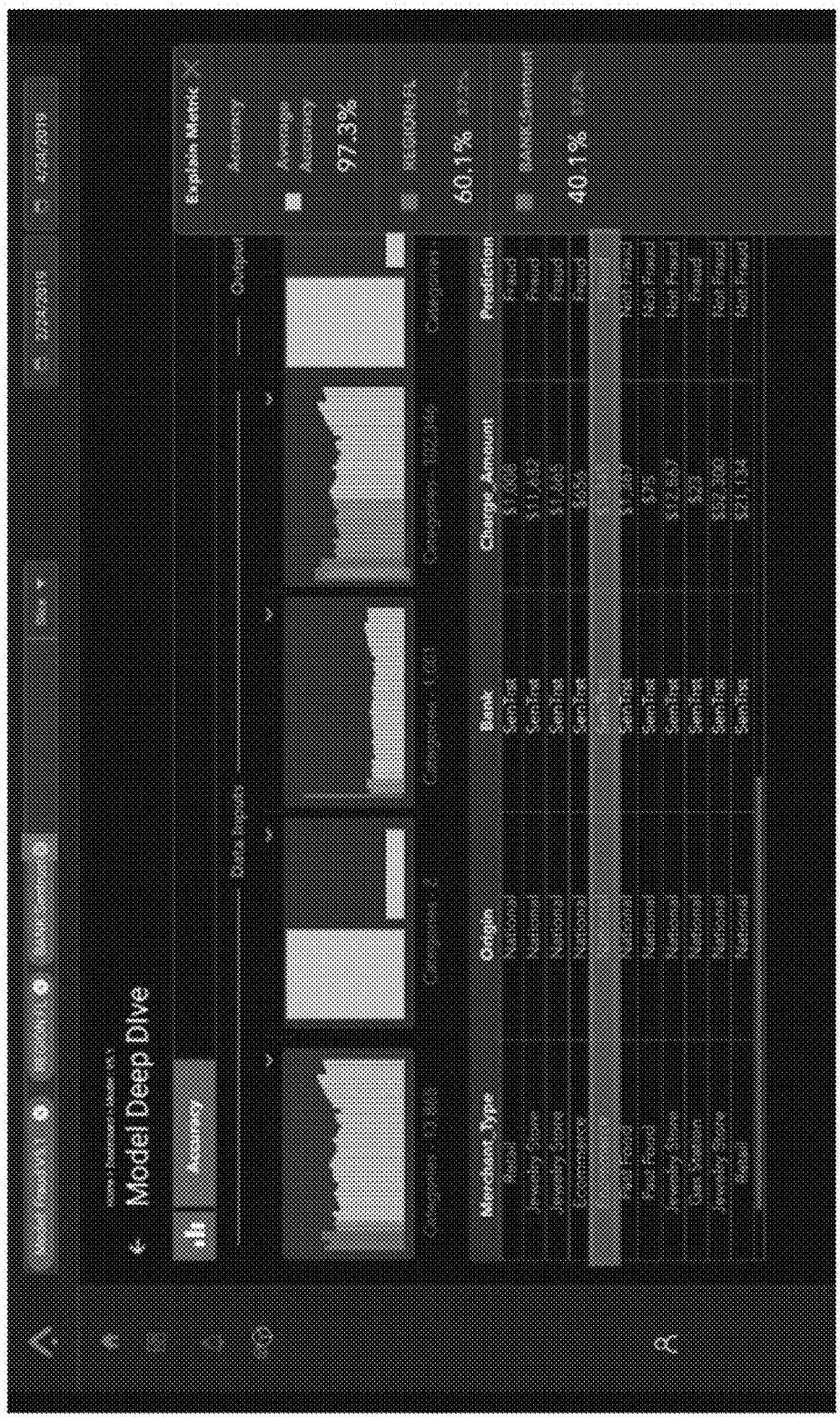
FIG. 8 shows an example platform visualizing a combination of performance and volume according to an exemplary embodiment of the present disclosure.

FIG. 8 shows an example platform visualizing a combination of performance and volume based on the Accuracy optimization metric. The highlighted slices are one standard deviation from average performance. Of course, platforms based on other optimization metrics can also be generated.

In various example embodiments, the optimization module 120 can be configured to generate an optimization metric called Recall Volume Score (RVS) of the slice by multiplying a complement of the Recall with the distribution count. That is, RVS may equal (1−Recall)*Distribution count. The optimization module 120 can be configured to generate an optimization metric called Precision Volume Score (PVS) of the slice by multiplying a complement of the Precision with the distribution count. That is, PVS may equal (1−Precision)*Distribution count. The optimization module 120 can be configured to generate an optimization metric called F1 Volume Score (F1VS) of the slice by multiplying a complement of the F1 with the distribution count. That is, F1VS may equal (1−F1)*Distribution count.

Similarly, in various example embodiments, the optimization module 120 can be configured to generate an optimization metric called MAE Volume Score (MAEVS) of the slice by multiplying MAE with the distribution count. That is, MAEVS may equal MAE*Distribution count. The optimization module 120 can be configured to generate an optimization metric called MAPE Volume Score (MAPEVS) of the slice by multiplying MAPE with the distribution count. That is, MAPEVS may equal MAPE*Distribution count. The optimization module 120 can be configured to generate an optimization metric called RMSE Volume Score (RMSEVS) of the slice by multiplying RMSE with the distribution count. That is, MAEVS may equal RMSE*Distribution count. The optimization module 120 can be configured to generate an optimization metric called MSE Volume Score (MSEVS) of the slice by multiplying MSE with the distribution count. That is, MSEVS may equal MSE*Distribution count.

In an example embodiment, the optimization module 120 can be configured to generate various optimization metrics based on a Slice Fraction of a slice, which is a ratio of the number of predictions of that slice and a total number of predictions. For example, in the example of FIGS. 3A and 3B, the Slice Fraction of slice 'REGION=CA' is ¾ and the Slice Fraction of slice 'REGION=CA & CHG AMOUNT>20,000' is ²⁄₄.

After obtaining the Slice Fraction, in various example embodiments, the optimization module 120 can be configured to generate an optimization metric called Volume Score Accuracy (Error Contribution) by multiplying a complement of the Accuracy with the Slice Fraction. That is, Volume Score Accuracy (Error Contribution) may equal (1−Accuracy)*Slice Fraction. The optimization module 120 can be configured to generate an optimization metric called Volume Score Recall (Error Contribution) by multiplying a complement of the Recall with the Slice Fraction. That is, Volume Score Recall (Error Contribution) may equal (1−Recall)*Slice Fraction. The optimization module 120 can be configured to generate an optimization metric called Volume Score Precision (Error Contribution) by multiplying a complement of the Precision with the Slice Fraction. That is, Volume Score Precision (Error Contribution) may equal (1−Precision)*Slice Fraction. The optimization module 120 can be configured to generate an optimization metric called Volume Score F1 (Error Contribution) by multiplying a complement of the F1 with the Slice Fraction. That is, Volume Score F1 (Error Contribution) may equal (1−F1)*Slice Fraction.

Similarly, in various example embodiments, the optimization module 120 can be configured to generate an optimization metric called Volume Score MAE (Error Contribution) by multiplying MAE with the Slice Fraction. That is, MAEVS may equal MAE*Slice Fraction. The optimization module 120 can be configured to generate an optimization metric called Volume Score MAPE (Error Contribution) by multiplying MAPE with the Slice Fraction. That is, MAPEVS may equal MAPE*Slice Fraction. The optimization module 120 can be configured to generate an optimization metric called Volume Score RMSE (Error Contribution) by multiplying RMSE with the Slice Fraction. That is, MAEVS may equal RMSE*Slice Fraction. The optimization module 120 can be configured to generate an optimization metric called Volume Score RMSE (Error Contribution) by multiplying MSE with the Slice Fraction. That is, MSEVS may equal MSE*Slice Fraction.

In an example embodiment, the optimization module 120 can be configured to create a first slice and a second slice that are based on a first vector value and a second vector value, respectively, and compare the accuracy volume score of the first slice with that of the second slice. For example, the first slice can be based on 'REGION=CA' and the second slice can be based on 'REGION=DE', with their accuracy volume score being 2 and 0, respectively. The machine learning model can then be optimized by fixing the 'REGION=CA' slice because it has a higher accuracy volume score. Of course, if the user so chooses, he/she can optimize the machine learning model by fixing the 'REGION=DE' slice.

In an exemplary embodiment, if the accuracy volume score of the first slice and the second slice are the same, the machine learning model can be optimized by fixing both slices. For example, the first slice can be based on 'REGION=CA' and the second slice can be based on 'CHG AMOUNT=9,0001-50,000, with their accuracy volume score being 2 each. The machine learning model can be optimized by fixing both slices. Of course, if the user so chooses, he/she can optimize the machine learning model by fixing any one of these slices.

Figure 9:
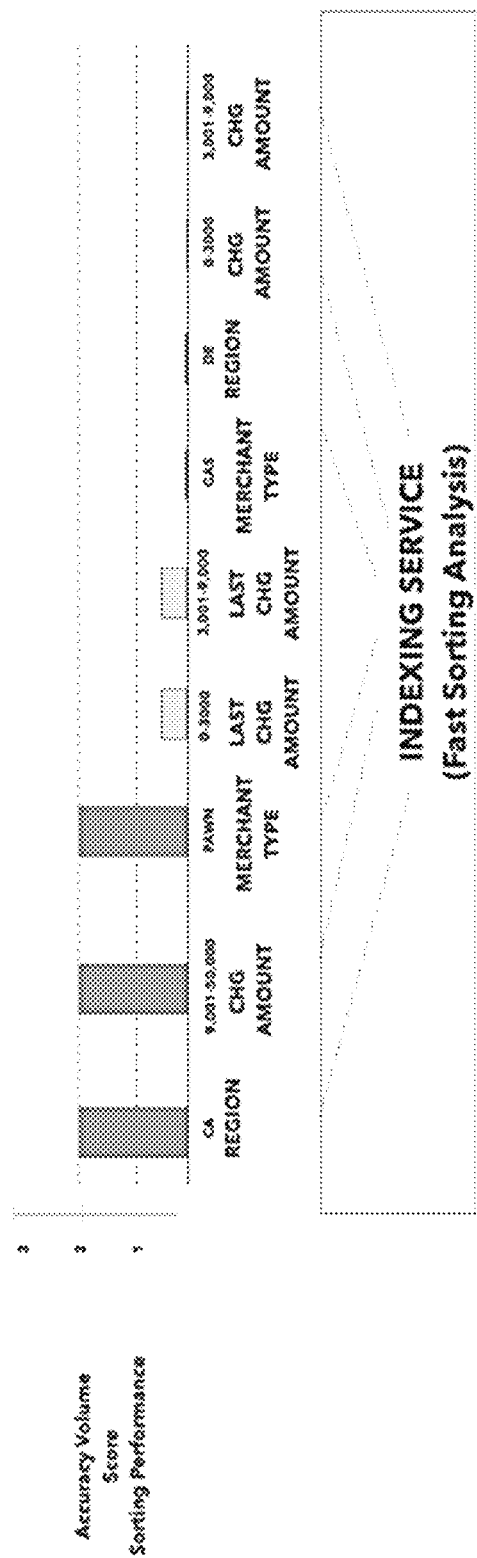
FIG. 9 shows an example of sorting and indexing the prediction slices based on their respective AVS according to exemplary embodiment of the present disclosure.

FIG. 9 shows an example of the optimization module 120 being configured to sort and index the prediction slices based on their respective AVS according to an example embodiment. Of course, the sorting and index are not limited by AVS and can be done based on various optimization metrics. Known techniques for sorting and indexing can be used. This can allow for fast searching and finding.

Figure 10:
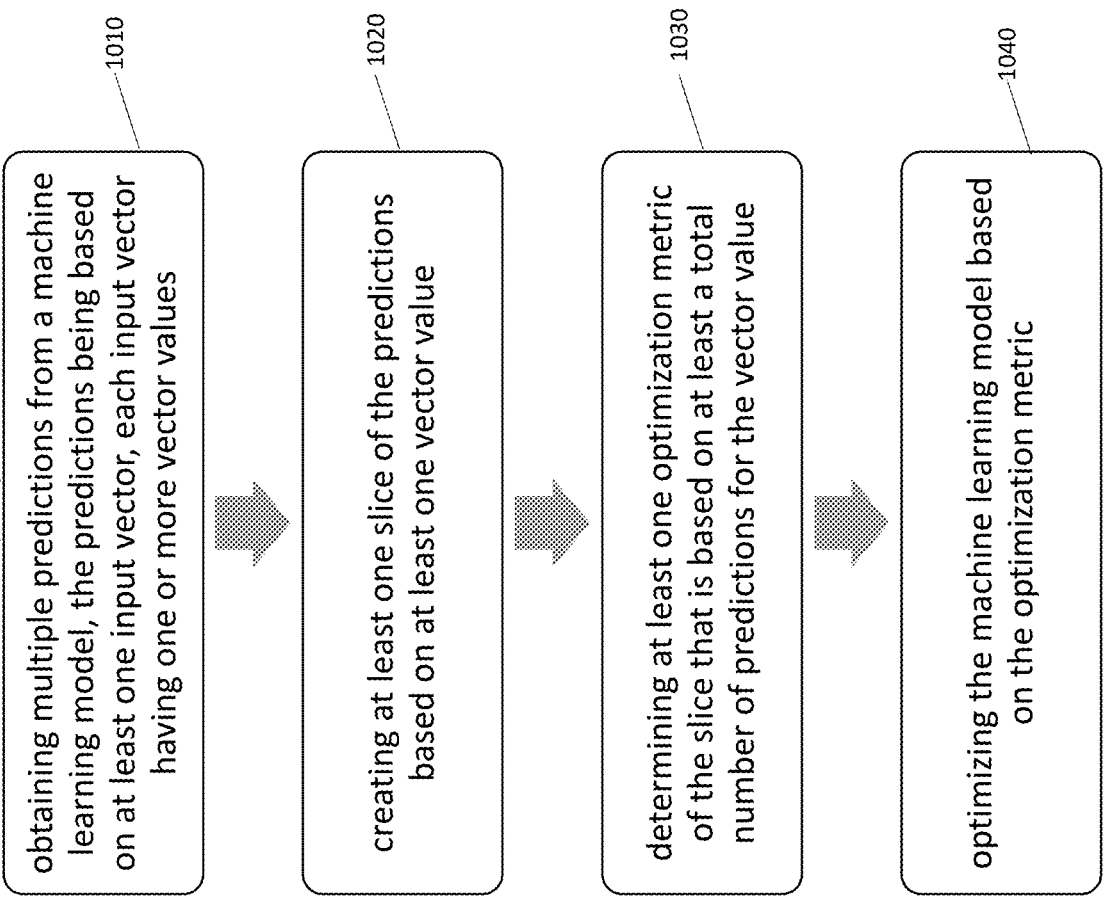
FIG. 10 shows a flowchart for a method for optimizing the machine learning model according to an exemplary embodiment of the present disclosure.

FIG. 10 shows a flowchart of a method 1000 for optimizing a machine learning model according to an embodiment of the present disclosure. The method 1000 can include a step 1010 of obtaining multiple predictions from a machine learning model such that the predictions are based on at least one input feature vector, each input feature vector having one or more vector values. Aspects of step 1010 relate to the previously described machine learning model 110 of the system 100.

The method 1000 can include a step 1020 of creating at least one slice of the predictions based on at least one vector value, a step 1030 of determining at least one optimization metric of the slice that is based on at least a total number of predictions for the vector value, and a step 1040 of optimizing the machine learning model based on the optimization metric. Aspects of the steps 1020, 1030 and 1040 relate to the previously described optimization module 120 of the system 100.

Figure 11:
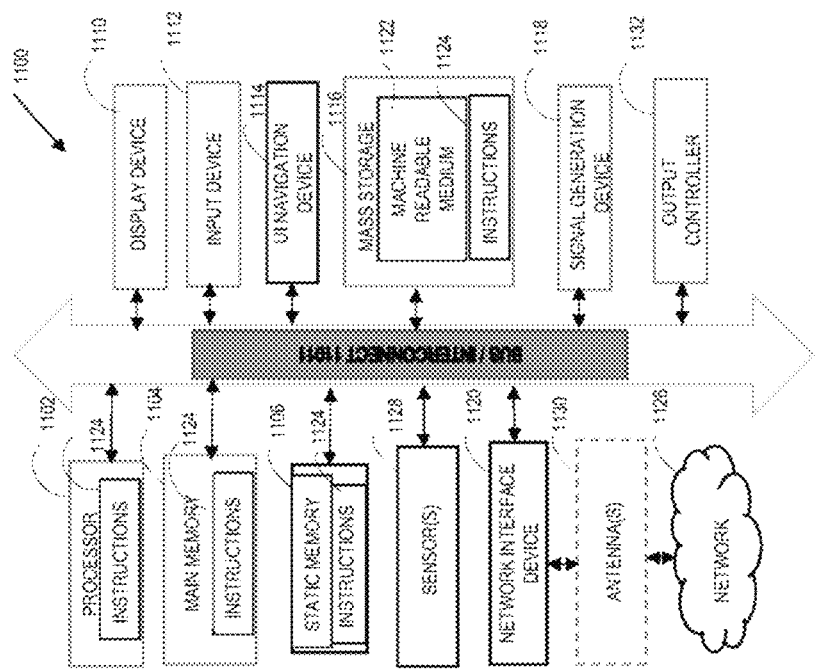
FIG. 11 illustrates a machine configured to perform computing operations according to an embodiment of the present disclosure.

FIG. 11 is a block diagram illustrating an example computer system 1100 upon which any one or more of the methodologies (e.g. system 100 and/or method 1000) herein discussed may be run according to an example described herein. Computer system 1100 may be embodied as a computing device, providing operations of the components featured in the various figures, including components of the system 100, method 1000, or any other processing or computing platform or component described or referred to herein.

In alternative embodiments, the computer system 1100 can operate as a standalone device or may be connected (e.g., networked) to other machines. In a networked deployment, the computing system 1100 may operate in the capacity of either a server or a client machine in server-client network environments, or it may act as a peer machine in peer-to-peer (or distributed) network environments.

Example computer system 1100 includes a processor 1102 (e.g., a central processing unit (CPU), a graphics processing unit (GPU) or both), a main memory 1104 and a static memory 1106, which communicate with each other via an interconnect 1108 (e.g., a link, a bus, etc.). The computer system 1100 may further include a video display unit 1110, an input device 1112 (e.g. keyboard) and a user interface (UI) navigation device 1114 (e.g., a mouse). In one embodiment, the video display unit 1110, input device 1112 and UI navigation device 1114 are a touch screen display. The computer system 1100 may additionally include a storage device 1116 (e.g., a drive unit), a signal generation device 1118 (e.g., a speaker), an output controller 1132, and a network interface device 1120 (which may include or operably communicate with one or more antennas 1130, transceivers, or other wireless communications hardware), and one or more sensors 1128.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 constituting machine-readable media.

While the machine-readable medium 1122 (or computer-readable medium) is illustrated in an example embodiment to be a single medium, the term "machine-readable medium" may include a single medium or multiple medium (e.g., a centralized or distributed database, and/or associated caches and servers) that store the one or more instructions 1124.

The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The term "machine-readable medium" shall accordingly be taken to include, but not be limited to, solid-state memories, optical media, magnetic media or other non-transitory media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of several well-known transfer protocols (e.g., HTTP). Examples of communication networks include a local area network (LAN), wide area network (WAN), the Internet, mobile telephone networks, Plain Old Telephone (POTS) networks, and wireless data networks (e.g., Wi-Fi, 3G, and 4G LTE/LTE-A or WiMAX networks). The term "transmission medium" shall be taken to include any intangible medium that can store, encoding, or carrying instructions for execution by the machine, and includes digital or analog communications signals or other intangible medium to facilitate communication of such software.

Other applicable network configurations may be included within the scope of the presently described communication networks. Although examples were provided with reference to a local area wireless network configuration and a wide area Internet network connection, it will be understood that communications may also be facilitated using any number of personal area networks, LANs, and WANs, using any combination of wired or wireless transmission mediums.

The embodiments described above may be implemented in one or a combination of hardware, firmware, and software. For example, the features in the system architecture 1100 of the processing system may be client-operated software or be embodied on a server running an operating system with software running thereon. While some embodiments described herein illustrate only a single machine or device, the terms "system", "machine", or "device" shall also be taken to include any collection of machines or devices that individually or jointly execute a set (or multiple sets) of instructions to perform any one or more of the methodologies discussed herein.

Examples, as described herein, may include, or may operate on, logic or several components, modules, features, or mechanisms. Such items are tangible entities (e.g., hardware) capable of performing specified operations and may be configured or arranged in a certain manner. In an example, circuits may be arranged (e.g., internally or with respect to external entities such as other circuits) in a specified manner as a module, component, or feature. In an example, the whole or part of one or more computer systems (e.g., a standalone, client or server computer system) or one or more hardware processors may be configured by firmware or software (e.g., instructions, an application portion, or an application) as an item that operates to perform specified operations. In an example, the software may reside on a machine readable medium. In an example, the software, when executed by underlying hardware, causes the hardware to perform the specified operations.

Accordingly, such modules, components, and features are understood to encompass a tangible entity, be that an entity that is physically constructed, specifically configured (e.g., hardwired), or temporarily (e.g., transitorily) configured (e.g., programmed) to operate in a specified manner or to perform part or all operations described herein. Considering examples in which modules, components, and features are temporarily configured, each of the items need not be instantiated at any one moment in time. For example, where the modules, components, and features comprise a general-purpose hardware processor configured using software, the general-purpose hardware processor may be configured as respective different items at different times. Software may accordingly configure a hardware processor, for example, to constitute a particular item at one instance of time and to constitute a different item at a different instance of time.

Additional examples of the presently described method (e.g. 1000), system (e.g. 100), and device embodiments are suggested according to the structures and techniques described herein. Other non-limiting examples may be configured to operate separately or can be combined in any permutation or combination with any one or more of the other examples provided above or throughout the present disclosure.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

It should be noted that the terms "including" and "comprising" should be interpreted as meaning "including, but not limited to". If not already set forth explicitly in the claims, the term "a" should be interpreted as "at least one" and "the", "said", etc. should be interpreted as "the at least one", "said at least one", etc. Furthermore, it is the Applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system for optimizing a machine learning model, the system comprising:
  a machine learning model that generates predictions based on at least one input feature vector, each input feature vector having one or more vector values; and
  an optimization module with a processor and an associated memory, the optimization module being configured to:
  create at least one slice of the predictions based on at least one vector value,
  determine at least one optimization metric of the slice that is based on at least a total number of predictions for the vector value, wherein the optimization metric includes:
    accuracy that is determined based on a ratio of the sum of a number of true positives (TPs) and true negatives (TNs) and sum of a number of TPs, false positives (FPs), TNs and false negatives (FNs),
    accuracy volume score (AVS) that is determined based on multiplying a complement of the accuracy with a distribution count of the slice, and
  optimize the machine learning model based on the optimization metric.

2. The system of claim 1, wherein the optimization metric includes recall that is determined based on a ratio of a number of TPs and a sum of a number of TPs and FNs.

3. The system of claim 2, wherein the optimization metric further includes recall volume score (RVS) that is determined based on multiplying a complement of the recall with a distribution count of the slice.

4. The system of claim 1, wherein
the at least one slice includes a first slice and a second slice such that the first slice's optimization metric is higher than the second slice's optimization metric, and
the optimization module is configured to fix the first slice to optimize the machine learning model.

5. The system of claim 1, wherein
the at least one slice includes a first slice and a second slice such that the first slice's optimization metric is equal to the second slice's optimization metric, and
the optimization module is configured to fix both the first slice and the second slice to optimize the machine learning model.

6. The system of claim 1, wherein
the at least one slice includes multiple slices based on multiple vector values respectively, and
the optimization module is configured to sort the multiple slices based on their respective optimization metric.

7. A system for optimizing a machine learning model, the system comprising:
a machine learning model that generates predictions based on at least one input feature vector, each input feature vector having one or more vector values; and
an optimization module with a processor and an associated memory, the optimization module being configured to:
create at least one slice of the predictions based on at least one vector value, determine at least one optimization metric of the slice that is based on at least a total number of predictions for the vector value, wherein the optimization metric includes precision that is determined based on a ratio of a number of TPs and a sum of a number of TPs and FPs, and precision volume score (PVS) that is determined based on multiplying a complement of the precision with a distribution count of the slice.

8. The system of claim 7, wherein the optimization metric further includes recall that is determined based on a ratio of a number of TPs and a sum of a number of TPs and FNs, and F1 that is determined based on a ratio of a multiplication of recall and precision and a sum of recall and precision.

9. The system of claim 8, wherein the optimization metric further includes F1 volume score (F1VS) that is determined based on multiplying a complement of the F1 with a distribution count of the slice.

10. A computer-implemented method for optimizing a machine learning model, the method comprising:
obtaining multiple predictions from a machine learning model, the predictions being based on at least one input feature vector, each input feature vector having one or more vector values;
creating at least one slice of the predictions based on at least one vector value;
determining at least one optimization metric of the slice that is based on at least a total number of predictions for the vector value, wherein the optimization metric includes:
accuracy that is determined based on a ratio of the sum of a number of true positives (TPs) and true negatives (TNs) and sum of a number of TPs, false positives (FPs), TNs and false negatives (FNs),
accuracy volume score (AVS) that is determined based on multiplying a complement of the accuracy with a distribution count of the slice; and
optimizing the machine learning model based on the optimization metric.

11. The method of claim 10, wherein the optimization metric includes recall that is determined based on a ratio of a number of TPs and a sum of a number of TPs and FNs.

12. The method of claim 11, wherein the optimization metric further includes recall volume score (RVS) that is determined based on multiplying a complement of the recall with a distribution count of the slice.

13. The method of claim 10, wherein
the at least one slice includes a first slice and a second slice such that the first slice's optimization metric is higher than the second slice's optimization metric, and
the optimizing includes fixing the first slice to optimize the machine learning model.

14. The method of claim 10, wherein
the at least one slice includes a first slice and a second slice such that the first slice's optimization metric is equal to the second slice's optimization metric, and
the optimizing includes fixing both the first slice and the second slice to optimize the machine learning model.

15. The method of claim 10, wherein
the at least one slice includes multiple slices based on multiple vector values respectively, and
the optimizing includes sorting the multiple slices based on their respective optimization metric.

16. A computer-implemented method for optimizing a machine learning model, the method comprising:
obtaining multiple predictions from a machine learning model, the predictions being based on at least one input feature vector, each input feature vector having one or more vector values;
creating at least one slice of the predictions based on at least one vector value;
determining at least one optimization metric of the slice that is based on at least a total number of predictions for the vector value, wherein the optimization metric includes:
precision that is determined based on a ratio of a number of TPs and a sum of a number of TPs and FPs, and
a precision volume score (PVS) that is determined based on multiplying a complement of the precision with a distribution count of the slice.

17. The method of claim 16, wherein optimization metric further includes recall that is determined based on a ratio of a number of TPs and a sum of a number of TPs and FNs, and F1 that is determined based on a ratio of a multiplication of recall and precision and a sum of recall and precision.

18. The method of claim 17, wherein the optimization metric further includes F1 volume score (F1VS) that is determined based on multiplying a complement of the F1 with a distribution count of the slice.

* * * * *